C. M. YOUNG.
HAY-LOADERS.

No. 170,796. Patented Dec. 7, 1875.

Witnesses:
John G. Center
H. F. Hayden

Inventor:
Charles M. Young
by A. M. Smith
Attorney

UNITED STATES PATENT OFFICE.

CHARLES M. YOUNG, OF MEADVILLE, PENNSYLVANIA.

IMPROVEMENT IN HAY-LOADERS.

Specification forming part of Letters Patent No. 170,796, dated December 7, 1875; application filed September 13, 1875.

*To all whom it may concern:*

Be it known that I, CHARLES M. YOUNG, of Meadville, county of Crawford, State of Pennsylvania, have invented certain new and useful Improvements in Hay-Loaders, of which the following is a full, clear, and exact description, reference being had to the accompanying drawings, making part of this specification, in which—

Figure 1:
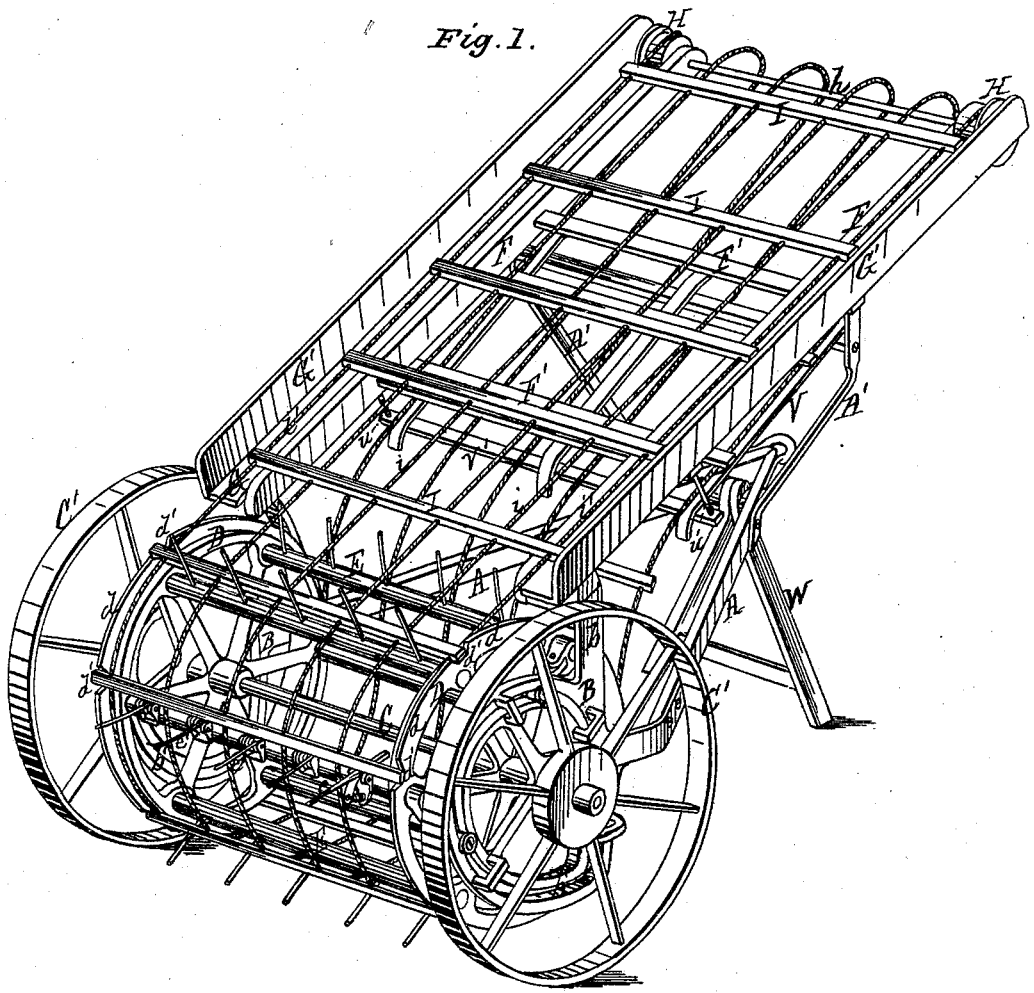
Figure 2:
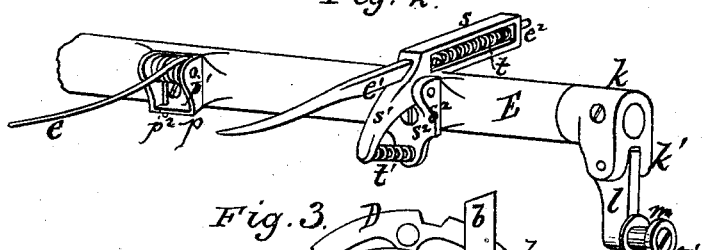
Figure 3:
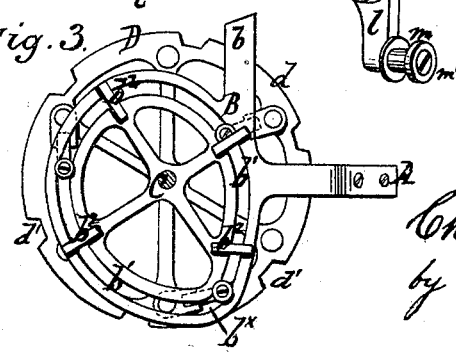

Figure 1 is a perspective view of a hay-loader with my improvements applied. Fig. 2 is a perspective view of one of the gathering heads or shafts detached; and Fig. 3 is a side elevation of one of the cam-frame plates detached.

Similar letters of reference denote corresponding parts of the machine wherever used.

My invention relates, first, to a novel construction and arrangement of stationary double-walled cams for actuating the toothed gathering-heads, and to a novel manner of combining the heads therewith for preventing cramping or binding of the parts; second, to a novel combination of yielding or spring teeth with the revolving and rocking gathering-heads; and, third, to a novel arrangement of adjustable gate in connection with the elevator for keeping the latter always under proper working tension, and for protecting the apron from the hay-rack, and also from the draft-bars.

In the accompanying drawings, A A represent two bars, united at their forward ends by a clip, $a$, which forms the point of connection with the hay-wagon by which the loader is drawn, said bars diverging thence to the rear, where they are united rigidly to cam-plates B B, in which the main axle C has its bearings, said bars A and cams B forming the draft-frame of the machine. The axle C has two carrying and driving wheels, C' C', mounted upon its ends in close proximity with the cam-plates B, and connected with said axle by suitable "backing" ratchets, making them each independent of the other, and inside of the cam-plates B, on the axle C, are driving disks or spiders D D, keyed to and turning with the axle, said disks forming the driving-pulleys for the elevator apron or carrier, and affording also bearings for the gathering heads or shafts E. These heads E consist of a series of cylindrical shafts pivoted in sockets or bearings near the periphery of the disks D D, forming, in connection therewith, a rotating drum, around which the carrier or hay-elevator passes, motion being imparted to said elevator thereby. The cam-plates B B, in advance of the axle, have uprights $b$ cast or otherwise rigidly connected with them, to the upper angular ends of which the lower rear ends of the inclined elevator frame-bars F F are rigidly connected, the forward ends of said bars being upheld from the draft-frame bars A by posts or uprights A'. The longitudinal bars F are framed together by transverse bars F', and, upon their outer sides or faces, have horizontal extension-strips G attached to them provided with vertical guards G', for preventing the escape laterally of the hay while the latter is being elevated. The upper ends of the bars F support a rod or shaft, $h$, upon the ends of which flanged pulleys H are mounted, said pulleys turning freely thereon, and forming the upper rollers of the carrier or hay-elevator apron. The elevator is composed of a series of transverse slats or bars, I, united at regular intervals to a series of endless straps, cords, or chains, $i$ $i'$, which pass around the driving-drum D E, and thence around the shaft $h$, and pulley H, and also around the intermediate elevator-frame F F'. The disks D at their outer faces have flanges $d$ extending beyond the body or pulley portion of the disk, and the ends of the slats I, projecting beyond the outer cords or straps $i'$, enter notches $d'$ cut in said flange $d$, and have a positive movement imparted to them, and thence to the elevator by the rotation of the driving-drum. The cam-plates B consist each of two parts, arranged one within the other in the same vertical plane, sufficiently separated to form the cam-groove $b^1$ between them, and the two parts are rigidly united by means of angular or U-shaped arms or brackets $b^2$, connecting their outer vertical faces, as shown. The cam-plates thus constructed, and united with the draft-bars and elevator-frame, as described, are so arranged that the eccentric or angular point $b^\times$, in the cam-groove $b^1$, is about in the same horizontal plane with, and slightly in advance of, the heads or shafts E when at the lowest point in their rotation with the disk D. The heads, or shafts E extend alternately at their opposite ends through the opposite disks D, and have applied to such extended ends socket-pieces $k$, provided with lugs or ears $k'$, in which a crank-arm, $l$, is pivoted, the wrist $l'$ of which has a grooved friction-roller, $m$, mounted upon it, which, in the revolution of the head with the disks D, travels in the cam-groove $b^1$.

By thus pivoting the crank-arm, the cramping or bending of said arm or of the rake-head, consequent upon any uneven shrinkage of the casting B, or twisting of the machine, is effectually prevented, while the groove in the friction-rollers $m$, or the washers $m'$, at each end thereof, prevent the escape of the crank-wrist from the cam-groove. By connecting the crank-arms with the opposite ends of the gathering-heads, the friction is evenly divided between the two cam-plates B, and side draft is obviated, and by the use of said crank-arms, controlled by the cam-grooves $b^1$, a rocking motion is imparted to the gathering-heads, causing the teeth applied thereto to descend into the hay for picking it up, elevating, and carrying it to a point above the drum and forward of its axial center, when the receding of the cam-groove toward said center causes the teeth to be withdrawn, depositing their load upon the elevator, by which it is carried forward and upward, and discharged into the hay-wagon.

The teeth $e$, applied to the heads E, are made to spring or yield to obstructions, such as would be liable to break them, and for this purpose are made of elastic wire coiled at their heel ends around a horizontal pivot, $p^1$, in a socket-plate, $p$, attached to the head E, the heel end of the wire passing through a slot or perforation at $p^2$, for securing the tooth and preventing vibration or rotation other than is due to the elasticity of the wire and its coil.

Another form of yielding tooth is shown at $e^1$, in which the shank $e^2$ of the tooth passes through a slotted socket in a holder, $s$, pivoted in a bracket, $s^2$, to the head E. The shank $e^2$, where it passes through the holder, is surrounded by a spring, $t$, the tension of which holds the tooth $e^1$ thrust out into working position, said spring allowing the tooth to yield or move inward when it meets with any heavy obstruction.

The pivoted holder has an arm, $s^1$, extending outward behind the tooth, and a spring, $t'$, between said arm and the bracket $s^2$, holds the pivoted holder with its tooth up to its work, except in the event of the tooth meeting with an obstruction in its path, when the spring $t'$ permits it to yield until the obstruction is passed.

For maintaining the proper working tension of the endless elevator-apron, a rectangular gate or frame, V, is employed, pivoted at its forward upper end in the uprights or standards A'. The rear end of the longitudinal bars of this frame are made in inverted runner form for facilitating the passage of the elevator-slats off the same, and the rear transverse bar $v'$ is connected with the elevator-frame by pendent bolts $u$, by means of which the swinging rear end of said frame may be adjusted nearer to or allowed to drop farther from the elevator-frame, for regulating the tension of the endless elevator-straps passing over the same, and for keeping the elevator free from the hay-rack, and also from the draft bars or frame.

W represents a stand pivoted between the draft-bars A A, near their forward ends, and folding back between said bars, where it is secured by a hook or button when not in use, said stand serving to uphold the draft-frame when not connected with the hay-wagon.

Parts of the machine not particularly described may be constructed in any usual way.

Having now described my invention, what I claim as new, and desire to secure by Letters Patent, is—

1. In a hay-loader, the combination, with the endless elevator, of the rotating and rocking gathering-heads E, provided with the crank-arms and the stationary frame-plates B B, provided with the cam-grooves $b^1$, actuating said rocking-heads, substantially as described.

2. The crank-arms $l$, pivoted to the rotating and rocking heads E, and operating in combination with the grooved cam-plates B, substantially as described.

3. In a hay-loader, the combination, with the endless elevator, of the yielding or spring gathering-teeth applied to the rotating and rocking heads E, arranged and operating substantially as described.

4. The combination, with the endless elevator, of the pendent adjustable gate V, for regulating the tension of the elevator belt or apron, and controlling its return path, substantially as described.

CHARLES M. YOUNG.

Witnesses:
A. S. CULLUM,
STURGES T. DICK.